(12) United States Patent
Phillips (10) Patent No.: US 8,336,785 B2
(45) Date of Patent: *Dec. 25, 2012

(54) REMOVABLY SECURING SMALL CONTACTLESS PAYMENT CARD TO ELECTRONIC DEVICE

(75) Inventor: Simon Phillips, York (GB)

(73) Assignee: MasterCard International, Inc., Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/269,080

(22) Filed: Oct. 7, 2011

(65) Prior Publication Data
US 2012/0116903 A1     May 10, 2012

Related U.S. Application Data

(63) Continuation of application No. 11/829,165, filed on Jul. 27, 2007, now Pat. No. 8,061,620.

(51) Int. Cl.
*G06K 19/06*     (2006.01)
(52) U.S. Cl. ............... 235/492; 340/572.1; 340/572.3; 340/572.8; 340/572.9
(58) Field of Classification Search ............... 235/492
See application file for complete search history.

(56) References Cited

U.S. PATENT DOCUMENTS

| | | | |
|---|---|---|---|
| 6,121,544 | A | 9/2000 | Petsinger |
| 6,343,744 | B1 * | 2/2002 | Shibata et al. ............... 235/492 |
| 6,863,220 | B2 | 3/2005 | Selker |
| 7,533,826 | B2 | 5/2009 | Phillips |
| 7,865,214 | B2 * | 1/2011 | Kushima ............... 455/562.1 |
| 2005/0178835 | A1 | 8/2005 | Akiho et al. |
| 2005/0238149 | A1 | 10/2005 | De Leon |
| 2005/0258245 | A1 | 11/2005 | Bates et al. |

(Continued)

FOREIGN PATENT DOCUMENTS

| | | | |
|---|---|---|---|
| JP | 2001067442 A | | 3/2001 |
| JP | 2004348500 A | * | 12/2004 |
| WO | WO 2007088898 A1 | * | 8/2007 |

OTHER PUBLICATIONS

"Vodafone and G&D Launch SIM Card Specification Initiative for Secure Element in NFC Mobile Phones", Giesecke & Devrient news release, Apr. 10, 2007, retrieved form http://www.gi-de.com/portal/page?_pageid=44,134571&_dad=portal&_schema=PORTAL on Oct. 30, 2009, 2pgs.

*Primary Examiner* — Thien M Le
*Assistant Examiner* — Christopher Stanford
(74) *Attorney, Agent, or Firm* — Buckley, Maschoff & Talwalkar LLC (57) ABSTRACT

A holder for a contactless payment card includes a substrate that has a first side and a second side that is opposite to the first side. There is an adhesive material on the first side of the substrate. The holder also includes at least one sheet that is joined to the substrate to form a pouch. The second side of the substrate faces the pouch. The pouch is shaped and sized to securely hold a contactless integrated circuit identification card that has no more than half of a planar extent defined for the standard ID-1 identification card.

13 Claims, 12 Drawing Sheets

U.S. PATENT DOCUMENTS

| | | |
|---|---|---|
| 2005/0279655 A1 | 12/2005 | Chen |
| 2006/0124748 A1 | 6/2006 | Osborn et al. |
| 2006/0187061 A1 | 8/2006 | Colby |
| 2006/0273176 A1 | 12/2006 | Audebert et al. |
| 2006/0290501 A1 | 12/2006 | Hammad et al. |
| 2008/0000987 A1 | 1/2008 | Augustinowicz et al. |
| 2008/0001844 A1 | 1/2008 | Sabbah et al. |
| 2009/0026277 A1 | 1/2009 | Phillips |

* cited by examiner

REMOVABLY SECURING SMALL CONTACTLESS PAYMENT CARD TO ELECTRONIC DEVICE

CROSS-REFERENCE TO RELATED APPLICATIONS

The present application is a continuation of U.S. patent application Ser. No. 11/829,165 entitled "REMOVABLY SECURING SMALL CONTACTLESS PAYMENT CARD TO ELECTRONIC DEVICE" and filed Jul. 27, 2007. The entire contents of that application are incorporated herein by reference.

BACKGROUND

It is well known to provide contactless payment cards in the standard ID-1 geometry (substantially 85.6×54 mm in planar extent). Such cards resemble conventional credit and debit cards in size and shape, and allow account holders to access debit or credit card accounts to pay for transactions by wireless communication between the contactless payment cards and proximity readers included in point of sale (POS) terminals.

Because of the wireless communication capability of these cards, it is feasible to enhance their convenience by shrinking their size, to perhaps one-half or one-third or less of the planar extent of the standard ID-1 geometry. In this reduced size, a contactless payment card may be carried as a fob on a key ring.

According to certain prior art proposals, it has been suggested that small contactless payment cards be integrated with handheld electronic devices such as mobile telephones. In one such proposal, the housing of a mobile telephone is configured to include one or more slots shaped and sized to receive small contactless payment cards. However, this approach requires coordination and cooperation with manufacturers of mobile telephones and/or with mobile telephone network operators. Also, if a slot or slots of a certain size are included in the mobile telephone housing, small contactless cards of other sizes would not be compatible with the mobile telephone. Still further, there may be significant added cost in modifying the mobile telephone design to accommodate contactless card slots.

In another prior art proposal, an adhesive layer is added to the rear of a contactless payment card, which may take the form of a somewhat flexible self-adhesive label. The card/label can then be adhered to the rear surface of a mobile telephone. One disadvantage with this approach may arise if the account holder wishes to replace the mobile telephone after attaching the payment card/label thereto. It may be difficult to remove the card/label from the mobile telephone housing, and may be impossible to attach the card/label to the cardholder's new mobile telephone. Also, if the account holder desires to change payment cards, the problem of removing the card/label from the mobile telephone housing again arises, and such removal may leave an adhesive residue on the mobile telephone housing. Still another disadvantage may arise if the account holder wishes to temporarily lend his/her mobile telephone to another individual, but does not wish to entrust his/her payment card to the individual.

Another possible disadvantage of the latter approach is that the layer of adhesive material on the card/label and/or the flexibility of the card/label may make it difficult to perform personalization processing on the card/label with conventional personalization equipment. Consequently, the cost of personalizing the card/label may be increased.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, which illustrate preferred and exemplary embodiments and which are not necessarily drawn to scale, wherein.

DETAILED DESCRIPTION

In general, and for the purpose of introducing concepts of embodiments of the present invention, a holder for a small contactless payment card is provided in the form of a self-adhesive label. The card holder may be attached to a handheld electronic device like a mobile telephone, and then the contactless payment card may be inserted into the holder to secure the contactless payment card to the electronic device. The card may be readily removed from the holder, to be similarly secured to another device, and/or to be replaced by another card.

In some embodiments, the holder may include a sliding element that is movable by the user between a position in which the sliding element blocks operation of the payment card and a position in which the sliding element permits operation of the payment card. A holder of this type may provide the same benefits that could be achieved by providing an on/off switch on the card itself, but without the added expense and complexity of modifying the card design. In these or other embodiments, the holder may also be configured to selectively hide or reveal information printed on the card.

Figure 1:
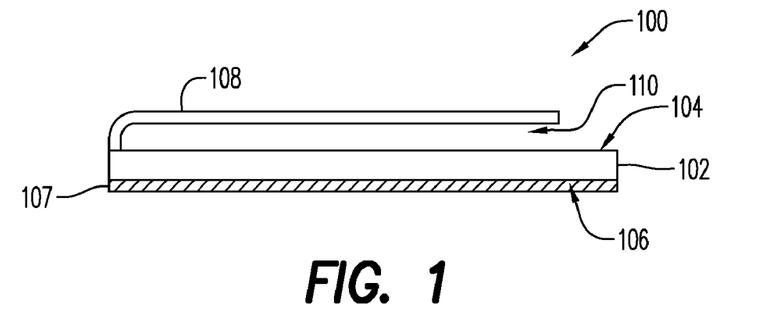
FIG. 1 is a schematic view of a cross-section, taken vertically, of a self-adhesive contactless card holder provided according to one embodiment of the present invention.
Figure 2:
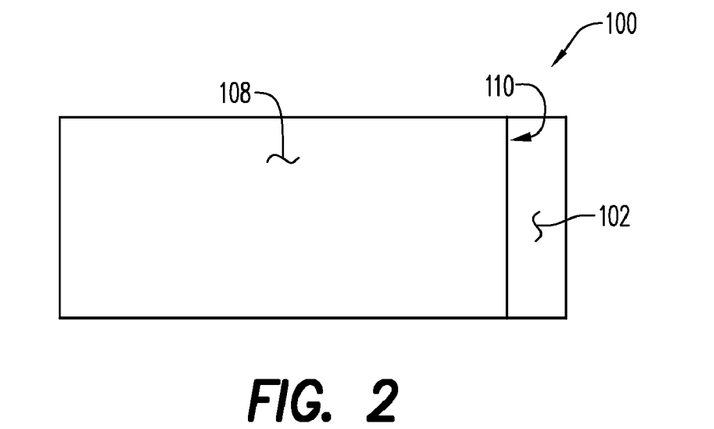
FIG. 2 is a schematic plan view of the contactless card holder of FIG. 1.

FIG. 1 is a schematic view of a cross-section, taken vertically, of a self-adhesive contactless card holder 100 provided according to one embodiment of the present invention. FIG. 2 is a schematic plan view of the card holder 100.

Referring primarily to FIG. 1, the card holder 100 includes a substrate 102, which may be formed of a suitable plastic material. The substrate 102 may be said to have a top side 104 and a bottom side 106. The bottom side 106 is opposite the top side 104 in the sense that it faces in the opposite direction from the top side 104. A layer of adhesive material 107 is formed on the bottom side 106 of the substrate 102.

The card holder 100 also includes a top sheet 108 that is joined to the substrate 102 to form a pouch 110 between the substrate 102 and the top sheet 108. The top sheet 108 may, but need not, be formed of the same material as the substrate 102. The pouch 110 may also be referred to as a "slot". (The slot or pouch 110 is shown in FIG. 1 by presenting the top sheet 108 and the substrate 102 as apart from each other; however, in practice the pouch or slot may collapse, in the absence of any card being inserted in the pouch or slot, so that the top sheet 108 lies upon the top side 104 of the substrate 102.) The top side 104 of the substrate 102 may be said to face the pouch 110.

The pouch 110 may have a shape and size such that the pouch 110 is configured to securely hold therein a small contactless payment card. For example, the contactless payment card may be substantially smaller, in planar extent, than the dimensions called for by the ID-1 standard. (For the purposes of this disclosure and the appended claims, the "planar extent" of an object refers to the area occupied by the object in the main plane of the object. Thus the "planar extent" of an ID-1 card is substantially 85.6×54 mm.) For example, the planar extent of the card to be inserted in the pouch 110 may be one-half, one-third, one-quarter or less, or another fraction or percentage, of the planar extent of an ID-1 card. For example, the card to be inserted in the pouch 110 may have a length that is substantially equal to the width (~54mm) of an ID-1 card, while having a width that is perhaps one-third to one-fifth the length (~86 mm) of the ID-1 card.

(Notwithstanding the manner in which the card holder 100 is illustrated in FIG. 1, the substrate 102 need not be thicker than the top sheet 108.)

Figure 3:
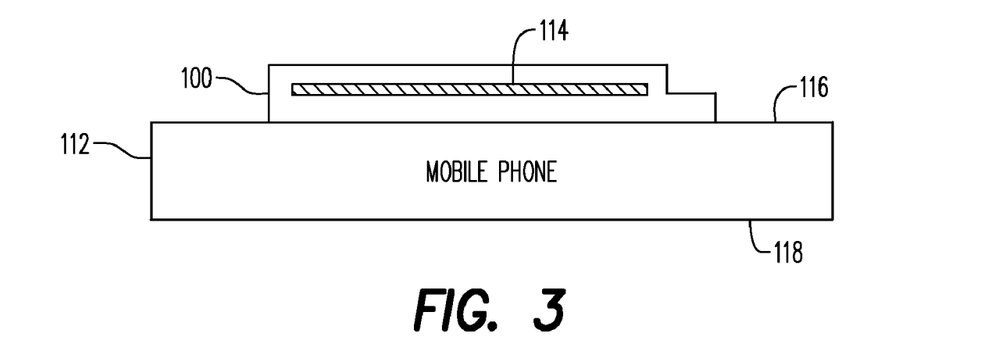
FIG. 3 is a schematic cross-sectional view showing the card holder of FIGS. 1 and 2 attached to a mobile telephone with a contactless payment card having been inserted into the card holder.

FIG. 3 is a schematic cross-sectional view showing the card holder 100 attached to a mobile telephone 112 with a contactless payment card 114 having been inserted into the card holder 100. To simplify the drawing, much of the detail has been omitted from the depiction in FIG. 3 of the card holder 100 and of the mobile telephone 112. The card holder 100 is shown in FIG. 3 as being attached to a rear surface 116 of the mobile telephone 112 (i.e., to the rear surface of the housing—not separately indicated—of the mobile telephone 112). The front surface 118 of the mobile telephone 112 is also indicated, and may be the location of typical mobile telephone features (not separately shown) such as a keypad, display screen, microphone, speaker, etc. The card holder 100 may be attached to the mobile telephone 112 by the above-mentioned adhesive layer (not separately shown in FIG. 3) of the card holder 100.

Figure 4:
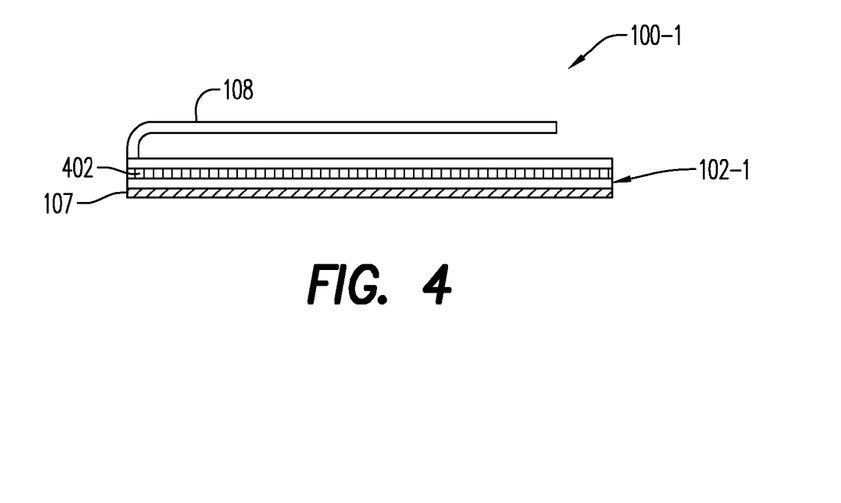
FIG. 4 is a view similar to FIG. 1 of another embodiment of the card holder.

The mobile telephone 112 contains a battery (not separately shown) or other components that may tend to short out the antenna (not separately shown in FIG. 3) of the payment card 114 and thus may tend to interfere with the operation of the payment card 114. FIG. 4 is a view similar to FIG. 1 of an alternative embodiment (indicated generally by reference numeral 100-1 in FIG. 4) of the card holder that is intended to address the potential problem referred to in the previous sentence. The card holder 100-1 of FIG. 4 differs from the card holder 100 of FIGS. 1 and 2 in that the substrate 102-1 includes a layer 402 of ferromagnetic material (e.g., soft iron) that tends to shield the payment card (not shown in FIG. 4) from the interfering effects of components of the mobile telephone.

Figure 5:
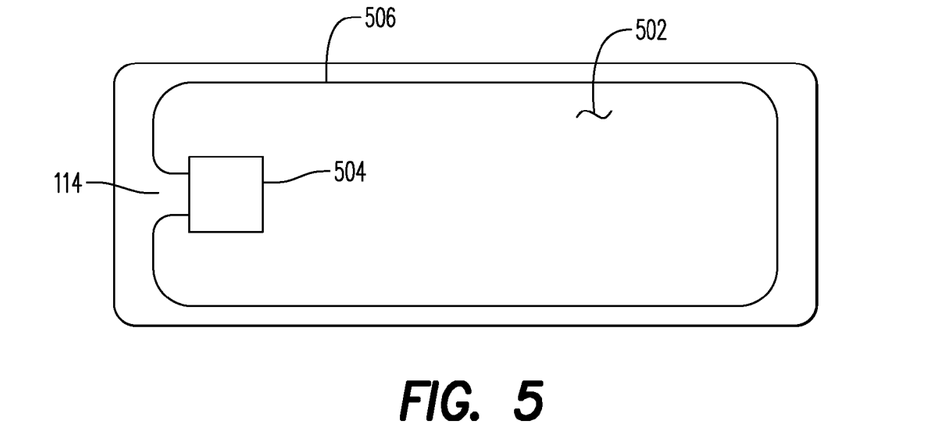
FIG. 5 is a schematic plan view of an example of the contactless payment card seen in FIG. 3.

FIG. 5 is a schematic plan view of an example of the contactless payment card 114 shown in FIG. 3. As seen from FIG. 5, the payment card 114 includes a card-shaped body 502 (e.g., laminated from layers of plastic) in which an RFID (radio frequency identification) chip 504 (IC or integrated circuit) is embedded. An antenna 506 is embedded in the card-shaped body 502 and runs along the periphery of the card-shaped body 502. The antenna 506 is coupled to the RFID chip 504 to allow the RFID chip 504 to receive interrogation signals from proximity reader devices included in POS terminals. The antenna 506 also allows the RFID chip to transmit payment card account information and other information to the POS terminals. The card 114 may be constructed and may operate in accordance with conventional practices. For purposes of illustration, the RFID chip and antenna are shown in FIG. 5, but in practical examples of the card 114 the card body may be formed largely of opaque plastic and the RFID chip and antenna may be embedded in the opaque plastic so as not to be visible. Instead, the card 114 may display branding information such as one or more logos of the issuing bank and of a payment card association, and also may display information, such as account number and account holder's name, that is specific to the particular card.

Reference was made above to the process of "personalizing" the payment card. As is familiar to those who are skilled in the art, during personalization, card specific information is wirelessly written into the card's RFID chip, and may also be printed on the card. In accordance with prior proposals, the process of personalization may be simplified by initially providing the card blank as part of an ID-1 sized assembly that includes scoring or the like to define the card within the ID-1 sized footprint of the assembly. The ID-1 sized assembly may then be processed for purposes of personalizing the card blank using the same standard types of personalization equipment conventionally used to personalize ID-1 sized contactless payment cards.

According to certain prior proposals (e.g., in U.S. Pat. No. 6,863,220), a contactless payment card may include a user-actuatable switch to turn the card on and off. The switch may normally be in an "off" condition, but may be actuated by the user to an "on" condition at the time of presenting the card for reading at a POS terminal. Such a switch may help to prevent certain attacks on the security of the account number stored in the card, by preventing the card from responding to unauthorized interrogation signals. However, it would be preferable not to incur the expense of incorporating a user-actuatable switch in payment cards.

Figure 6:
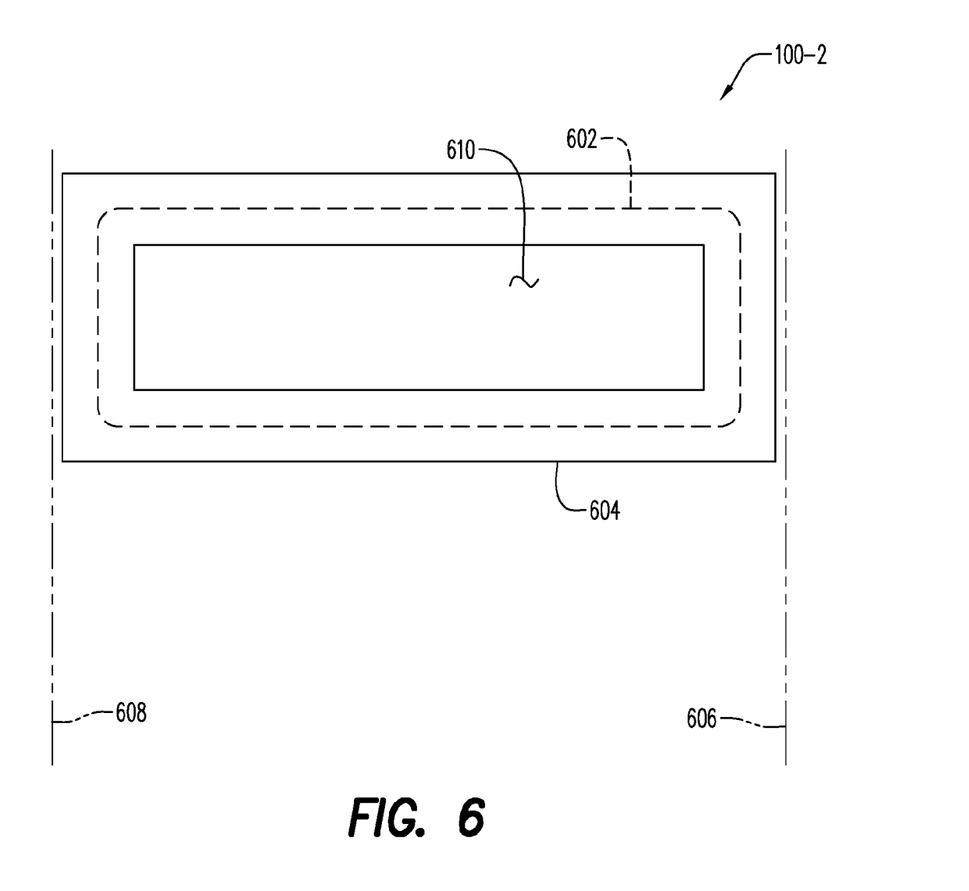
FIG. 6 is a schematic plan view of another embodiment of a card holder, while the card holder is in a condition to block operation of a payment card that has been inserted therein.

In accordance with aspects of the present invention, some embodiments of the card holder may include a shield that can be selectively positioned either to permit interrogation signals to reach the payment card, or to shield the card from interrogation signals. FIG. 6 is a schematic plan view of one such embodiment of a card holder (indicated generally by reference numeral 100-2 in FIG. 6). FIG. 6 shows the card holder 100-2 in a condition in which the card is shielded from interrogation signals. The card itself is not explicitly shown, except by a dashed-line rounded rectangle (reference numeral 602), which represents the locus of the card antenna. The card holder 100-2 is also represented schematically, with the pouch for receiving the card, and the structure (e.g., substrate and top sheet) that forms the pouch, not explicitly shown in the drawing. Also, the adhesive layer of the card holder is not shown.

Reference numeral 604 indicates a shield member, formed as a hollow rectangle that is proportioned to entirely cover the card antenna 602 when the shield member is suitably positioned, as depicted in FIG. 6. The holder 100-2 includes the shield member 604, as well as parallel tracks or guides schematically represented at 606, 608. The shield member 604 is mounted on the tracks 606, 608 so as to allow the shield member 604 to be slidingly moved by the user from the position shown in FIG. 6 to the position shown in FIG. 7. (The tracks may be suitably formed in or on or supported by a holder substrate or top sheet such as those discussed above. Thus the shield member 604 is movable relative to other structures (not shown) of the holder 100-2, such as a substrate and top sheet that form a pouch to hold the payment card in the locus indicated at 602 in both drawings.) In the particular embodiment shown in FIGS. 6 and 7, the sliding movement of the shield member is parallel to the plane of the payment card and is transverse (in this case, perpendicular) to the longitudinal axis of the payment card.

When the shield member 604 is in the position shown in FIG. 6, it is directly above the card antenna 602 and serves to block signals from being received by and/or transmitted from the card antenna 602. The shield member 604 may be made of any suitable material, such as a suitable metal foil. When the shield member 604 is in the position shown in FIG. 7, it is offset away from the locus of the card antenna 602, and allows the card antenna to receive and/or transmit signals. The shield member 604 may be directly slidable by being pushed by the user's finger or thumb, or alternatively may be connected to a suitable button, lever, and/or linkage or mechanism (none shown) to allow the user to indirectly actuate sliding motion of the shield member 604.

With a shield like the shield member 604 (or other shield embodiments described below) provided as part of a card holder, the user may move the shield to effectively enable and disable operation of the payment card within the card holder, thereby obtaining essentially the same functionality as would be provided by a user-actuatable on/off switch included in the card itself.

Figure 7:
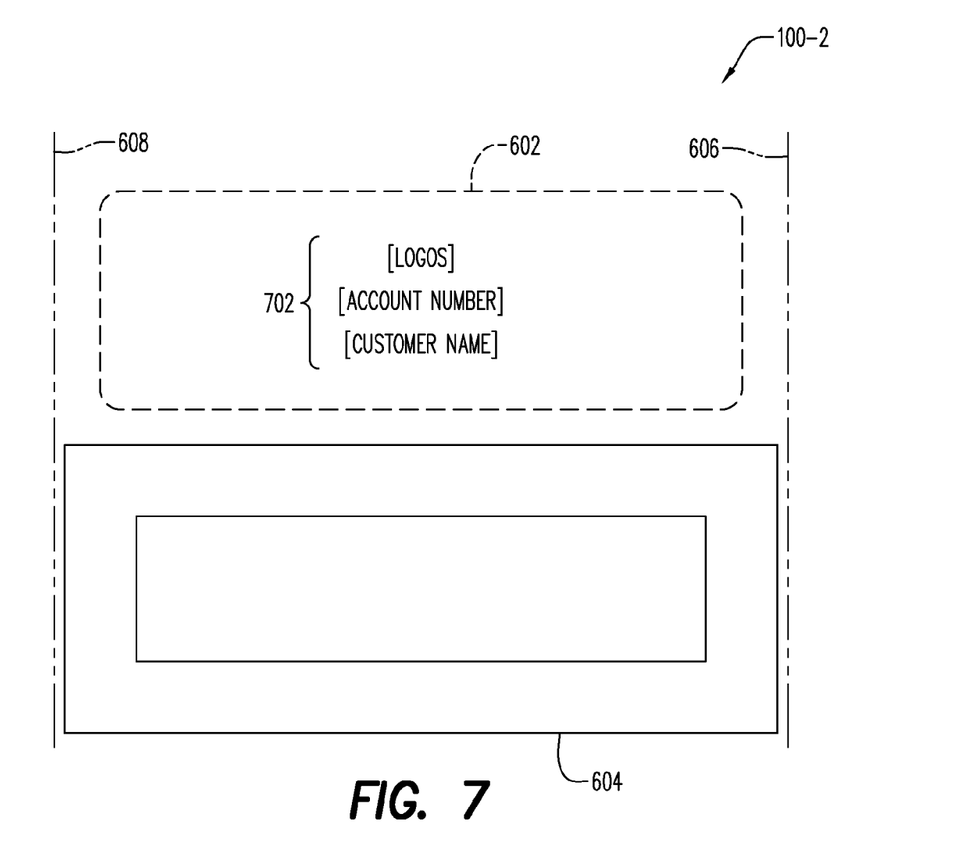
FIG. 7 is a view similar to FIG. 6, showing the card holder of FIG. 6 in a condition to permit operation of the payment card that has been inserted therein.

In some embodiments, the card holder top sheet referred to above may be formed of clear plastic, to allow the user to readily read card-specific information, such as the number of the account accessed via the card, from the card while it is inside the card holder. However, for security reasons, it may be desirable that the card holder normally conceal the account number and/or other information on the card while the card is inside the card holder. Accordingly, it may be desirable that the shield member be opaque so that when the shield member is in the position to block the payment card from receiving/transmitting signals, the shield member also conceals any symbols printed on the payment card. Moreover, when the shield member is in the position to permit the payment card to receive/transmit signals, symbols printed on the payment card may be visible. Such an arrangement is schematically illustrated in FIGS. 6 and 7. In FIG. 7, with the shield member 604 in the latter position, symbols schematically indicated at 702 (e.g., branding logos, account number, account holder name) are visible. (It is to be understood that these symbols 702 are printed on the payment card, which is not otherwise depicted in FIG. 7, apart from the antenna 602.) In FIG. 6, with the shield member 604 in the former position, the symbols are concealed. (For example, the shield member 604 may have an inner panel 610 that is formed of opaque plastic. Alternatively, the shield member may be uniformly constructed of, e.g., a suitable metal foil to both block signal receipt/transmission and to conceal symbols printed on the payment card.)

Figure 8:
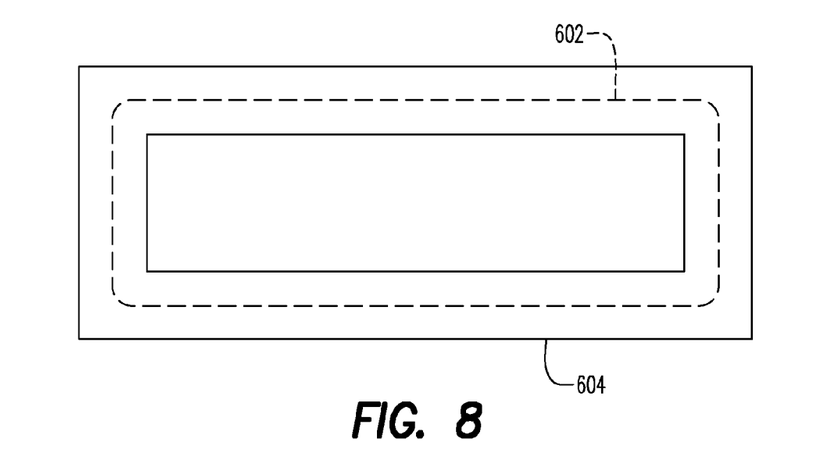
FIG. 8 is a view similar to FIG. 6, showing yet another embodiment of a card holder, while the card holder is in a condition to block operation of a payment card that has been inserted therein.
Figure 9:
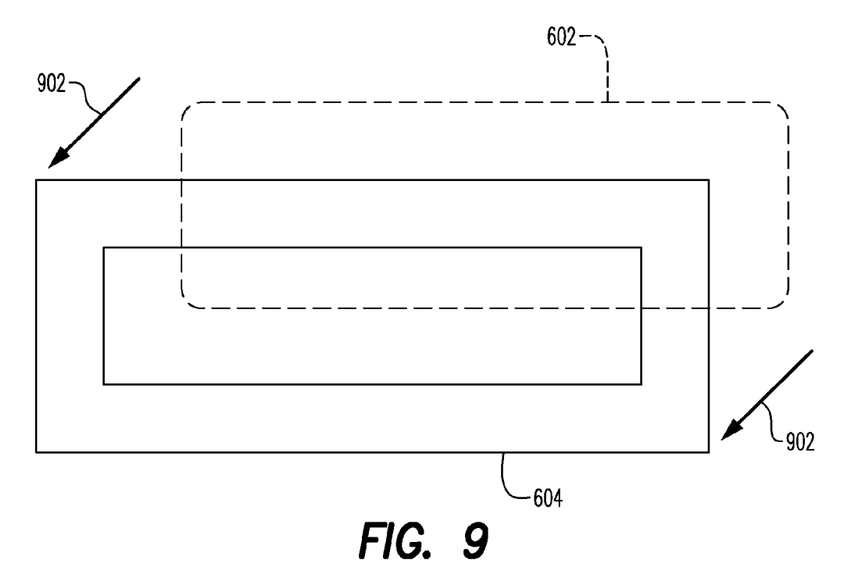
FIG. 9 is a view similar to FIG. 8, showing the card holder of FIG. 8 in a condition to permit operation of the payment card that has been inserted therein.

FIGS. 8 and 9 schematically illustrate another embodiment of a card holder which includes a capability for selectively disabling/enabling a payment card contained within the card holder. As in FIGS. 6 and 7, the dashed-line rounded rectangle 602 indicates the locus of an antenna which is part of a payment card contained within a pouch (not shown) which is part of a card holder according to this embodiment. Also as in FIGS. 6 and 7, the hollow rectangle 604 is representative of a shield member which is included in the card holder for selectively blocking or not blocking receipt/transmission of signals via the antenna 604. (The card holder is not indicated in FIGS. 8 and 9 apart from the shield member 604.) In FIG. 8, the shield member is shown in a position to block receipt/transmission of signals via the antenna 602 of the payment card (which is not depicted apart in FIGS. 8 and 9 from the antenna 602). In FIG. 9, the shield member 604 is shown in a position in which the shield member substantially unmasks the antenna 602 to permit signals to be received/transmitted by the antenna 602. The shield member 604 is moved (e.g., by being pushed by the user's finger/thumb) from the position of FIG. 8 to the position of FIG. 9 in a diagonal direction indicated by arrows 902. The shield member 604 may be moved by sliding along tracks which are not shown but are aligned with the diagonal direction indicated by the arrows 902. The diagonal movement of the shield member 604 causes the shield member 604 to be displaced both laterally and longitudinally relative to its position shown in FIG. 8.

Figure 10:
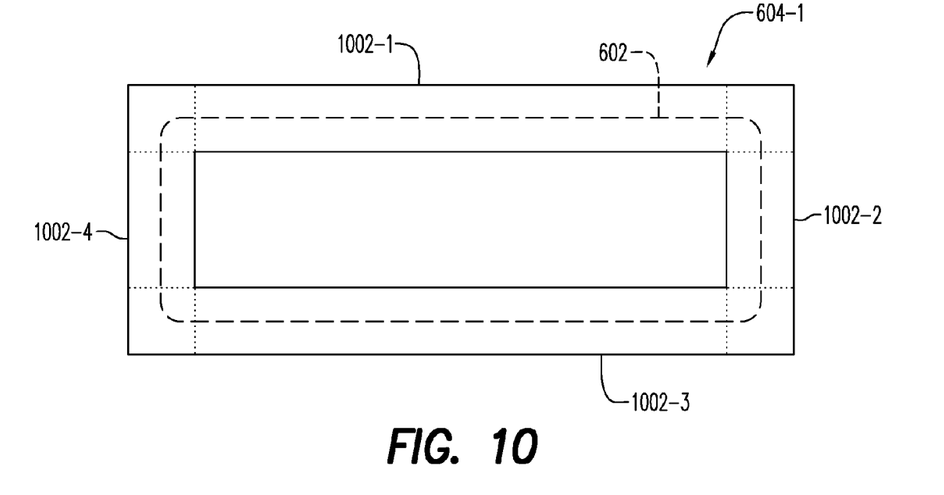
FIG. 10 is a view similar to FIG. 6, showing another embodiment of a card holder, while the card holder is in a condition to block operation of a payment card that has been inserted therein.
Figure 11:
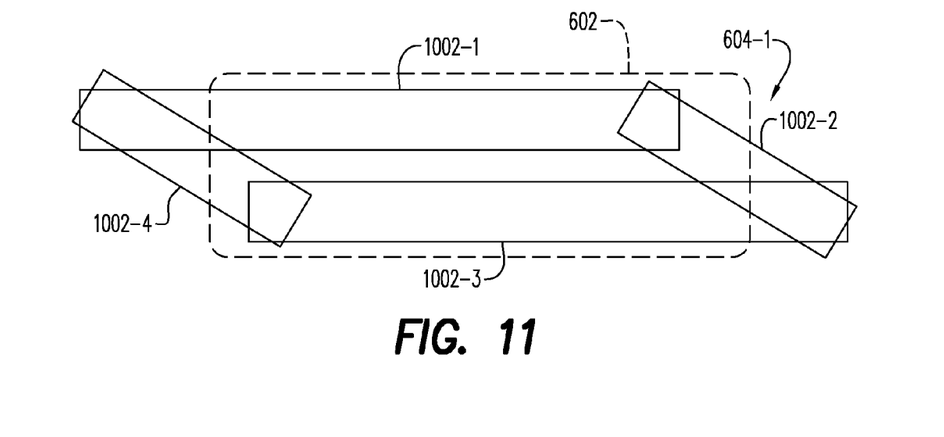
FIG. 11 is a view similar to FIG. 10, showing the card holder of FIG. 10 in a condition to permit operation of the payment card that has been inserted therein.

FIGS. 10 and 11 schematically illustrate yet another embodiment of a card holder which includes a capability for selectively disabling/enabling a payment card contained within the card holder. As before, the rounded rectangle 602 indicates the locus of the payment card antenna, for a payment card contained within the pouch (not shown) of a card holder provided according to this embodiment. The shield provided in this embodiment is generally indicated by reference numeral 604-1. In this embodiment, the shield 604-1 is formed of four side members 1002-1, 1002-2, 1002-3 and 1002-4. In the shield configuration shown in FIG. 10, the side members 1002-1 through 1002-4 are positioned to form the four sides of a hollow rectangle. Each of the side members 1002-1 through 1002-4 is pivotally joined at its ends to two other of the side members 1002-1 through 1002-4. The shield 604-1 is thus pivotally constructed, and further is mounted on the card holder (not separately shown) for movement between its rectangular configuration shown in FIG. 10 and a collapsed parallelogram configuration shown in FIG. 11. In the configuration of FIG. 11, the shield 604-1 substantially unmasks the antenna 602 to permit signals to be received/transmitted by the antenna 602. The shield 604-1 may be moved between its configurations shown respectively in FIGS. 10 and 11 by being pushed directly via the user's thumb or finger, or by being pushed indirectly via a suitable button or lever (not shown) that is actuated by the user's thumb or finger. When in the configuration shown in FIG. 10, the shield 604-1 blocks signals from being received/transmitted by the antenna 602.

Figure 12:
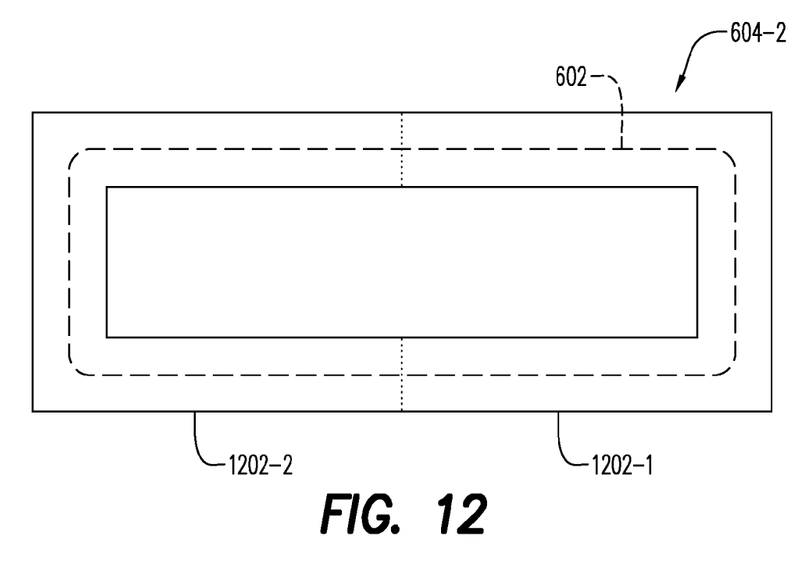
FIG. 12 is a view similar to FIG. 6, showing another embodiment of a card holder, while the card holder is in a condition to block operation of a payment card that has been inserted therein.
Figure 13:
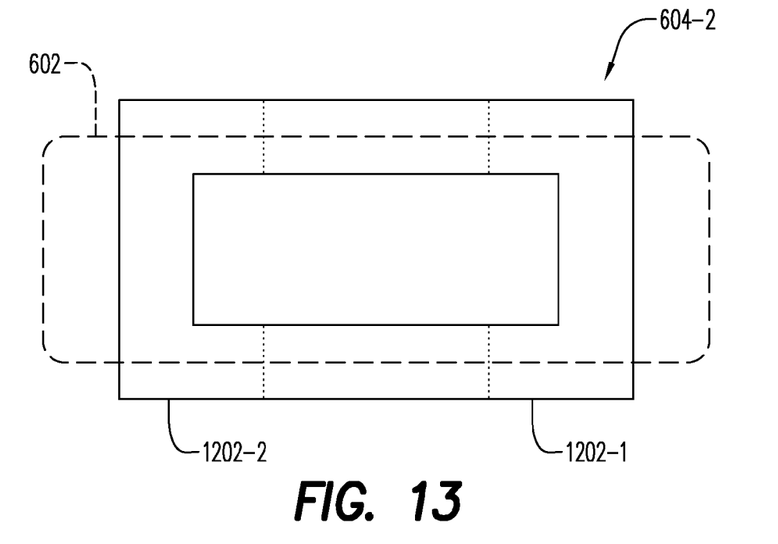
FIG. 13 is a view similar to FIG. 12, showing the card holder of FIG. 12 in a condition to permit operation of the payment card that has been inserted therein.

FIGS. 12 and 13 schematically illustrate another embodiment of a card holder which includes a capability for selectively disabling/enabling a payment card contained within the card holder. As before, the dashed-line rounded rectangle 602 indicates the locus of an antenna which is part of a payment card contained within a pouch (not shown) which is part of a card holder according to this embodiment. The shield provided in this embodiment is generally indicated by reference numeral 604-2. In this embodiment the shield 604-2 is formed of two U-shaped members 1202-1 and 1202-2 which are arranged, in the configuration shown in FIG. 12, with their open ends meeting to form the same hollow rectangle configuration seen in previously described embodiments. The members 1202-1, 1202-2 may be mounted on the card holder (not separately shown) for movement between the configuration shown in FIG. 12 and the configuration shown in FIG. 13. In the configuration shown in FIG. 13, the two members 1202-1 and 1202-2 have been moved toward each other to as to partially overlap and to substantially unmask the antenna 602 to permit signals to be received/transmitted by the antenna. As before, the movement of the members 1202-1 and 1202-2 may be accomplished by direct pushing contact from the user's thumb/finger, or indirectly by the user actuating a suitable button/lever/linkage/mechanism (not shown). When in the configuration shown in FIG. 12, the shield 604-2 blocks signals from being received/transmitted by the antenna 602.

Figure 14:
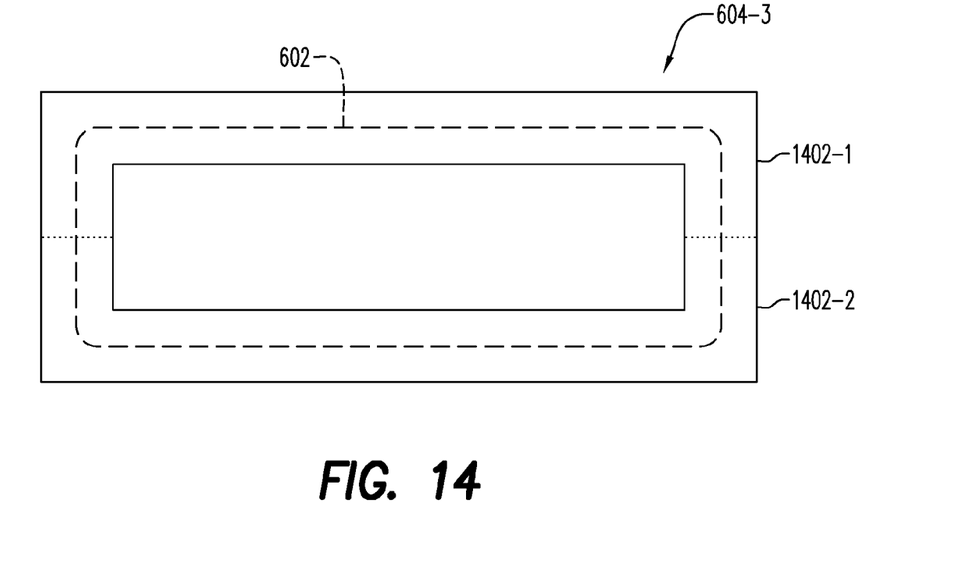
FIG. 14 is a view similar to FIG. 6, showing another embodiment of a card holder, while the card holder is in a condition to block operation of a payment card that has been inserted therein.
Figure 15:
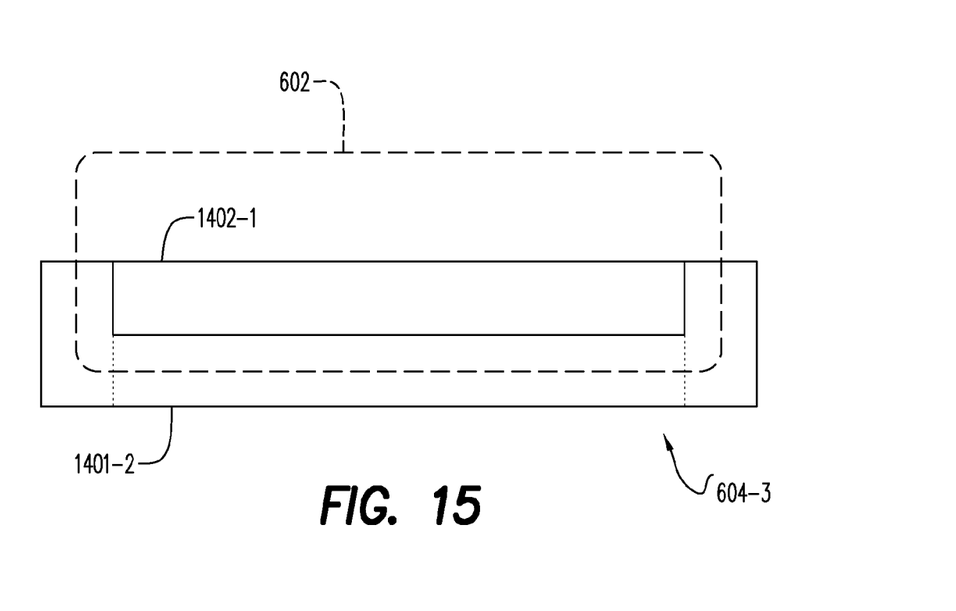
FIG. 15 is a view similar to FIG. 14, showing the card holder of FIG. 14 in a condition to permit operation of the payment card that has been inserted therein.

FIGS. 14 and 15 schematically illustrate another embodiment of a card holder which includes a capability for selectively disabling/enabling a payment card contained within the card holder. Once more, the dashed-line rounded rectangle 602 indicates the locus of an antenna which is part of a payment card contained within a pouch (not shown) which is part of a card holder according to this embodiment. The shield provided in this embodiment is generally indicated by reference numeral 604-3. In somewhat similar fashion to the embodiment of FIGS. 12 and 13, the shield in the embodiment of FIGS. 14 and 15 is formed of two U-shaped members 1402-1 and 1402-2. However, in this embodiment, the base of the "U" is the long side of the hollow rectangle formed in the configuration of FIG. 14, rather than the base of the "U" being the short side of the hollow rectangle, as seen in FIG. 12. Moreover, in the embodiment of FIGS. 14 and 15, only one of the two members 1402-1, 1402-2 is moveable (say member 1402-1), while the other member is fixedly mounted (i.e., stationary). In particular, tracks (not shown) or the like may be provided on the card holder to allow the member 1402-1 to slide from the position shown in FIG. 14 to the position shown in FIG. 15. Once more, the member 1402-1 may be moved by being directly pushed by the user's finger or thumb, or may be moved by a suitable linkage/mechanism (not shown) actuated by the user manipulating a button or lever (not shown). When the member is in the position shown in FIG. 15, the antenna 602 is substantially unmasked, so that the shield 604-3 allows the antenna 602 to receive/transmit signals. When the member is in the position shown in FIG. 14, the shield 604-3 blocks signals from being received/transmitted by the antenna 602.

Figure 16:
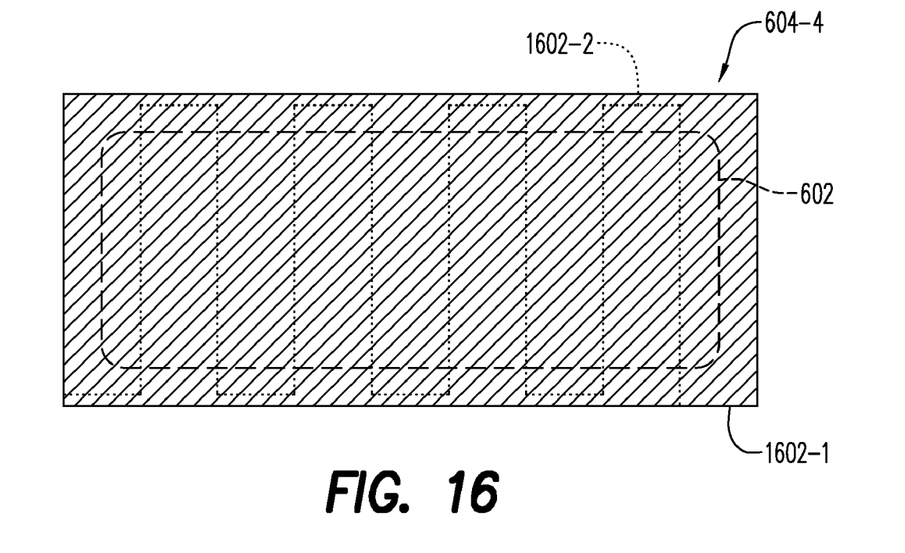
FIG. 16 is a view similar to FIG. 6, showing another embodiment of a card holder, while the card holder is in a condition to block operation of a payment card that has been inserted therein.
Figure 17:
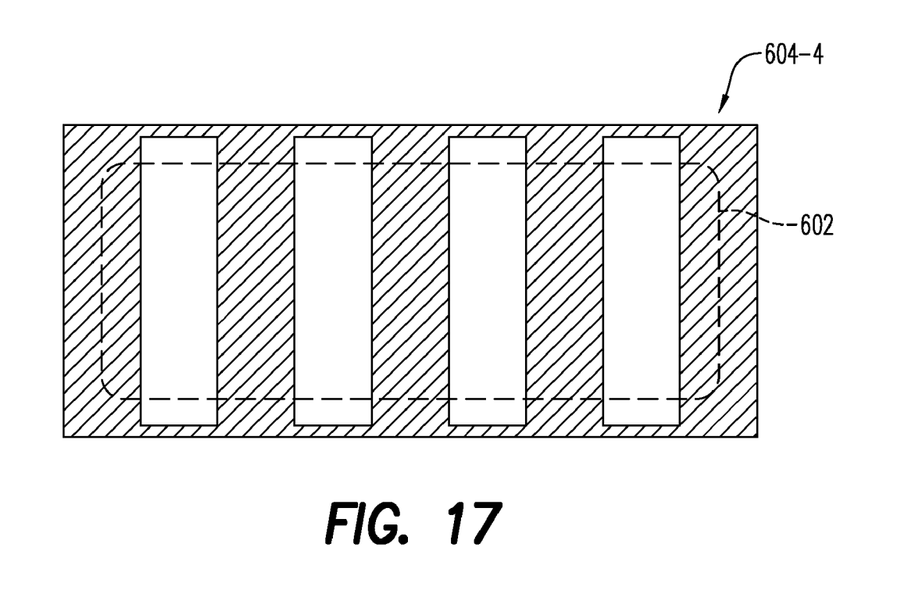
FIG. 17 is a view similar to FIG. 16, showing the card holder of FIG. 16 in a condition to permit operation of the payment card that has been inserted therein.

FIGS. 16 and 17 schematically illustrate another embodiment of a card holder which includes a capability for selectively disabling/enabling a payment card contained within the card holder. Again, the dashed-line rounded rectangle 602 indicates the locus of an antenna which is part of a payment card contained within a pouch (not shown) which is part of a card holder according to this embodiment. The shield provided in this embodiment is generally indicated by reference numeral 604-4. The shield 604-4 is formed from two members 1602-1 and 1602-2. Each of the members 1602-1, 1602-2 is configured as a series of blades arranged in a linear sequence transversely to the longitudinal axes of the blades in a horizontal plane, with spaces in between the blades, such that the arrangement of the blades is akin to the rungs of a ladder. Each blade is of the same width, which is equal to the distance between each two adjacent blades. In the condition shown in FIG. 16, the blades of member 1602-2 are positioned to cover the spaces between the blades of member 1602-1, so that the two members 1602-1, 1602-2 together substantially totally mask the antenna 602. With the members 1602-1, 1602-2 positioned as shown in FIG. 16, the shield 604-4 formed by the members 1602-1, 1602-2 blocks signals from being received/transmitted by the antenna 602. One of the members, say 1602-2, may be mounted on the card holder so as to be movable in the longitudinal direction by a distance equal to the width of the blades. A suitable pair of tracks (not shown) or the like may be provided to guide a sliding motion of the member 1602-2. Such movement by the member 1602-2 leads to the condition shown in FIG. 17, in which the spaces in the two members 1602-1, 1602-2 are aligned so as to substantially unmask the antenna 602. With this arrangement, a portion of the shield 604-4 (i.e., member 1602-2) is movable in a direction that coincides with the longitudinal axis of the payment card. With the members 1602-1, 1602-2 positioned relative to each other so as to form the condition shown in FIG. 17, the shield 604-4 permits signals to be received/transmitted by the antenna 602. The member 1602-2 may be moved by being directly pushed by the user's finger or thumb or by the user actuating a suitable button/lever/linkage/mechanism (not shown).

Figure 18:
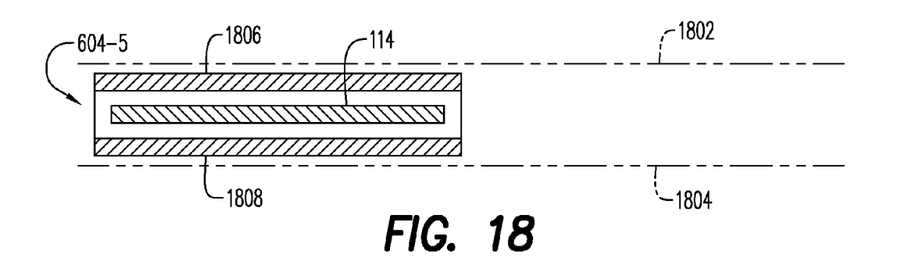
FIG. 18 is a schematic view, taken in vertical cross section, of another embodiment of a card holder (with payment card inserted therein), while the card holder is in a condition to block operation of the payment card.
Figure 19:
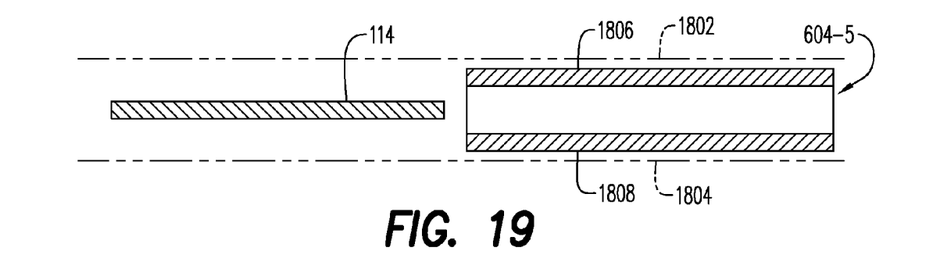
FIG. 19 is a view similar to FIG. 18, showing the card holder of FIG. 18 in a condition to permit operation of the payment card.

FIGS. 18 and 19 schematically illustrate another embodiment of a card holder which includes a capability for selectively disabling/enabling a payment card contained within the card holder. Unlike FIGS. 6-17, which are shown in plan view, FIGS. 18 and 19 are taken in vertical cross-section. Reference numeral 114 in FIGS. 18 and 19 indicates a payment card contained within the pouch (not shown) of the card holder, which is not shown apart from a shield 604-5 and tracks (schematically indicated at 1802, 1804) provided on the card holder to accommodate sliding motion of the shield 604-5.

The shield 604-5 includes an upper portion 1806 for selectively masking the payment card 114 from above and a lower portion 1808 for selectively masking the payment card 114 from below. The upper and lower portions 1806, 1808 of the shield 604-5 are joined together so that the portions 1806, 1808 move together with the shield 604-5 as the shield 604-5 slides along the tracks 1802, 1804.

When the shield 604-5 is in the position shown in FIG. 18, it blocks signals from being received/transmitted by the payment card 114. When the shield 604-5 is in the position shown in FIG. 19, it no longer masks the payment card 114, which is thus permitted to receive/transmit signals. As before, the sliding motion of the shield 604-5 may be brought about by the user directly pushing the shield 604-5 with his/her finger or thumb, or by the user actuating a suitable button/lever/linkage/mechanism.

In other embodiments, the shield for selectively disabling/enabling the payment card may be formed with different geometries, and/or may be movable in other modes, besides those illustrated in the above example embodiments.

Figure 20:
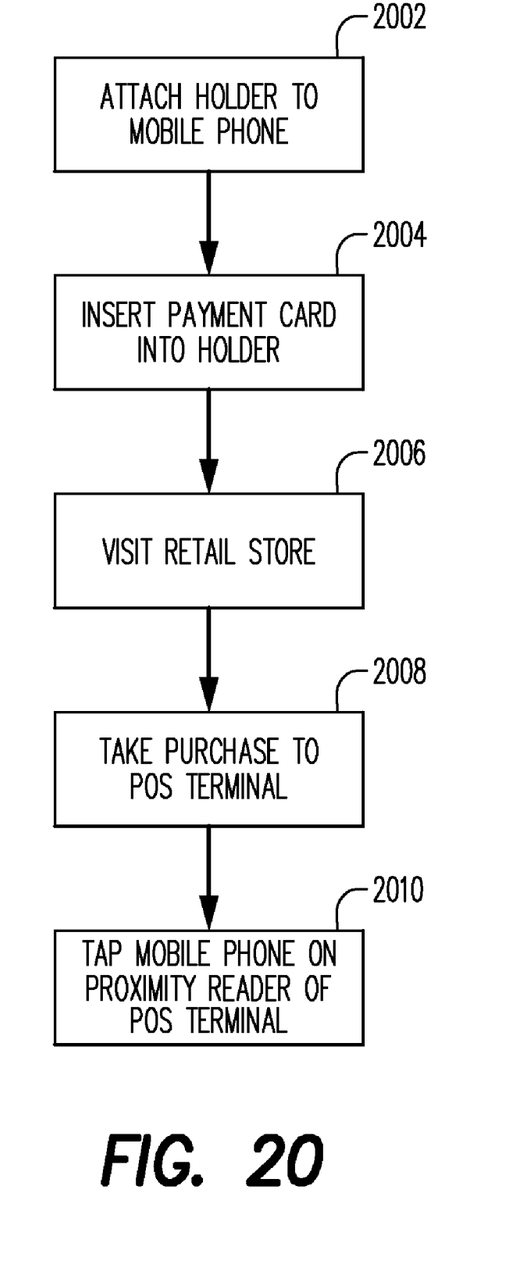
FIG. 20 is a flow chart that illustrates a process that may be performed according to aspects of the present invention.

FIG. 20 is a flow chart that illustrates a process that may be performed according to aspects of the present invention.

At 2002 in FIG. 20, the user attaches a card holder to his/her mobile telephone. The card holder may be in accordance with any one or more of the embodiments described hereinabove. From previous discussion, it will be appreciated that the card holder may be attached to the mobile telephone by an adhesive layer that is provided on a surface of the card holder (e.g., on the lower surface of the card holder substrate referred to above).

At 2004, the user inserts a contactless payment card, such as the payment card 114 described above, into the pouch of the card holder that has been attached to the mobile telephone. In this way the payment card is removably secured to the mobile telephone, bringing about the condition schematically illustrated in FIG. 3.

At 2006, the user takes the mobile telephone, with card holder and payment card attached, with him/her while he/she visits at retail store. At 2008, the user makes a selection of merchandise at the store and presents the merchandise for purchase at a POS terminal in the store. After the sales clerk has entered the items to be purchased into the POS terminal (e.g., by scanning barcodes on the merchandise), the user effects payment (2010 in FIG. 20) for the transaction by tapping the mobile telephone (e.g., with the payment card side down) on the proximity reader component of the POS terminal. With the payment card thus or otherwise brought into proximity with the reader, wireless communications are exchanged between the payment card and the reader. In this manner, the user's payment card account number is communicated to the POS terminal and used to authorize and settle the purchase transaction.

Figure 21:
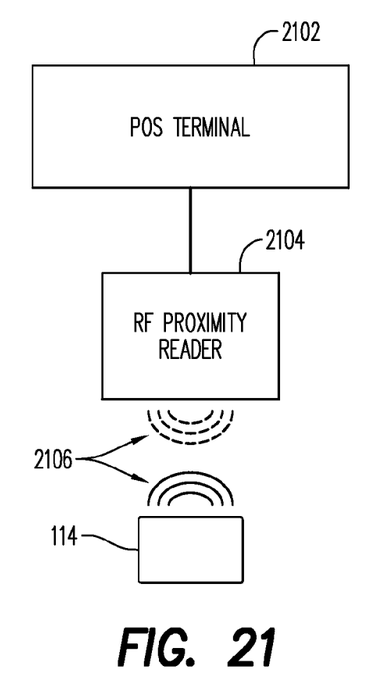
FIG. 21 schematically illustrates some communication aspects of a purchase transaction performed using the mobile telephone/payment card combination of FIG. 3.

FIG. 21 schematically illustrates some communication aspects of the purchase transaction. The POS terminal is represented at block 2102, and block 2104 represents the proximity reader interfaced to or incorporated in the POS terminal 2102. The payment card is indicated at 114, and the wireless communication between the payment card 114 and the proximity reader 2104 is indicated at 2106.

Figure 22:
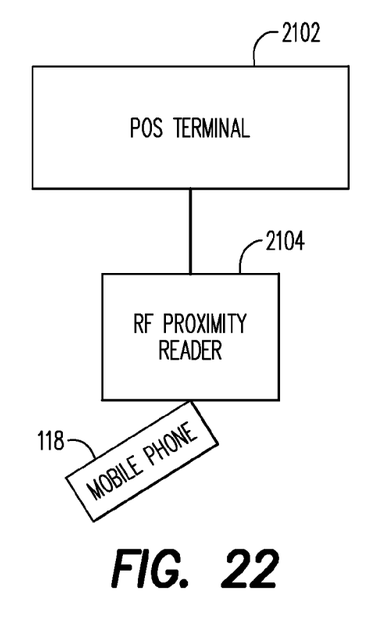
FIG. 22 schematically illustrates some physical aspects of the purchase transaction of FIG. 21.

FIG. 22 schematically illustrates some physical aspects of the purchase transaction. As in FIG. 21, the POS terminal 2102 and its associated proximity reader 2104 are shown. The mobile phone 118 is also shown in proximity to the proximity reader 2104. It is assumed that the mobile phone includes the arrangement of FIG. 3, whereby the card holder (not shown in FIG. 22) is attached to the mobile phone and the payment card (not shown in FIG. 22) is secured to the mobile phone by having been inserted into the pouch (not shown) of the card holder.

In embodiments described up to this point, the card holder has been attached to a mobile phone. More generally, however, the card holder may be attached to any type of electronic device, such as a handheld music player (e.g., an iPod) or a personal digital assistant (PDA; including, e.g., devices sold under the name "BlackBerry"), a pager, etc.

The above-described embodiments have included those in which a payment card holder has a shield to selectively disable/enable a payment card contained within the card holder. However, not every card holder that has such a shield need necessarily be attached or suitable for attachment to an electronic device. For example, in alternative embodiments of the card holder, no adhesive is included, and the card holder may be in the form of a key ring fob or in another form factor, but including a shield of the type referred to in the first sentence of this paragraph, such as the shields disclosed in various ones of the embodiments herein.

Up to this point, the invention has been discussed in terms of contactless payment cards. Alternatively, however, the principles of the invention may be applied to other types of contactless identification cards, such as those used to permit access to a transit system, or those used to identify participants in a customer loyalty system.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method, comprising:
attaching a holder, by an adhesive layer formed on the holder, to an electronic device, wherein the holder includes a shield which includes (i) a pair of members and (ii) a contactless integrated circuit (IC) identification card within a pouch formed in the holder in order to secure the contactless IC identification card to the electronic device;
wherein the contactless IC identification card includes a card-shaped body, an antenna embedded in the card-shaped body, and an IC embedded in the card-shaped body and coupled to the antenna; and
moving the two members relative to each other between a first configuration and a second configuration, the two members, when in the first configuration, positioned to block signals from being received by and/or transmitted from the antenna of the contactless IC identification card; the two members, when in the second configuration, positioned to partially overlap each other so as to unmask the antenna of the contactless IC identification card, thereby allowing the antenna to receive and/or transmit signals, wherein a degree of overlap between the two members is substantially greater in the second configuration as compared to the first configuration.

2. The method of claim 1, wherein the contactless IC identification card is a payment card.

3. The method of claim 2, further comprising:
bringing the electronic device, with the contactless IC identification card secured thereto, into proximity with a reader component of a point of sale terminal in order to pay for a purchase transaction.

4. The method of claim 1, wherein the contactless IC identification card has a planar extent that is no more than half of a planar extent defined for a standard ID-1 identification card.

5. The method of claim 1, wherein the holder substantially conceals all symbols printed on the contactless IC identification card.

6. The method of claim 1, wherein the electronic device is a mobile telephone, a portable music player, or a portable digital assistant (PDA).

7. A holder for a contactless integrated circuit (IC) identification card, the contactless IC identification card including an antenna, the holder comprising:
   structure for defining a slot that is shaped and sized to receive the contactless IC identification card; and
   a shield which includes a pair of members, the members supported on the structure so as to be movable relative to each other between a first configuration and a second configuration; the two members, when in the first configuration, positioned to block signals from being received by and/or transmitted from the antenna of a contactless IC identification card located in the slot; the two members, when in the second configuration, positioned to partially overlap each other so as to unmask the antenna of the contactless IC identification card located in the slot, thereby allowing the antenna to receive and/or transmit signals, wherein a degree of overlap between the two members is substantially greater in the second configuration as compared to the first configuration.

8. The holder of claim 7, wherein the structure has an adhesive formed on an outer surface of the structure for attaching the holder to an electronic device.

9. An apparatus comprising:
   an electronic device that includes a housing;
   a holder attached by adhesive to an outer surface of the housing of the electronic device; and
   a contactless integrated circuit (IC) identification card inserted in the holder;
   wherein the contactless IC identification card includes a card-shaped body, an antenna embedded in the card-shaped body, and an IC embedded in the card-shaped body and coupled to the antenna, and further wherein the holder includes a shield comprising two members, the members movable relative to each other between a first configuration and a second configuration; the two members, when in the first configuration, positioned to block signals from being received by and/or transmitted from the antenna of the contactless IC identification card; the two members, when in the second configuration, positioned to partially overlap each other so as to unmask the antenna of the contactless IC identification card, thereby allowing the antenna to receive and/or transmit signals, wherein a degree of overlap between the members is substantially greater in the second configuration as compared to the first configuration.

10. The apparatus of claim 9, wherein the electronic device is a mobile telephone, a portable music player, or a portable digital assistant (PDA).

11. The apparatus of claim 9, wherein the contactless IC identification card is a payment card.

12. The apparatus of claim 9, wherein the contactless IC identification card has a planar extent that is no more than half of a planar extent defined for a standard ID-1 identification card.

13. The apparatus of claim 9, wherein the holder substantially conceals all symbols printed on the contactless IC identification card.

* * * * *